No. 680,457. Patented Aug. 13, 1901.
A. L. HOCKETT.
COTTON CHOPPER.
(Application filed Dec. 14, 1899.)
(No Model.) 2 Sheets—Sheet 1.
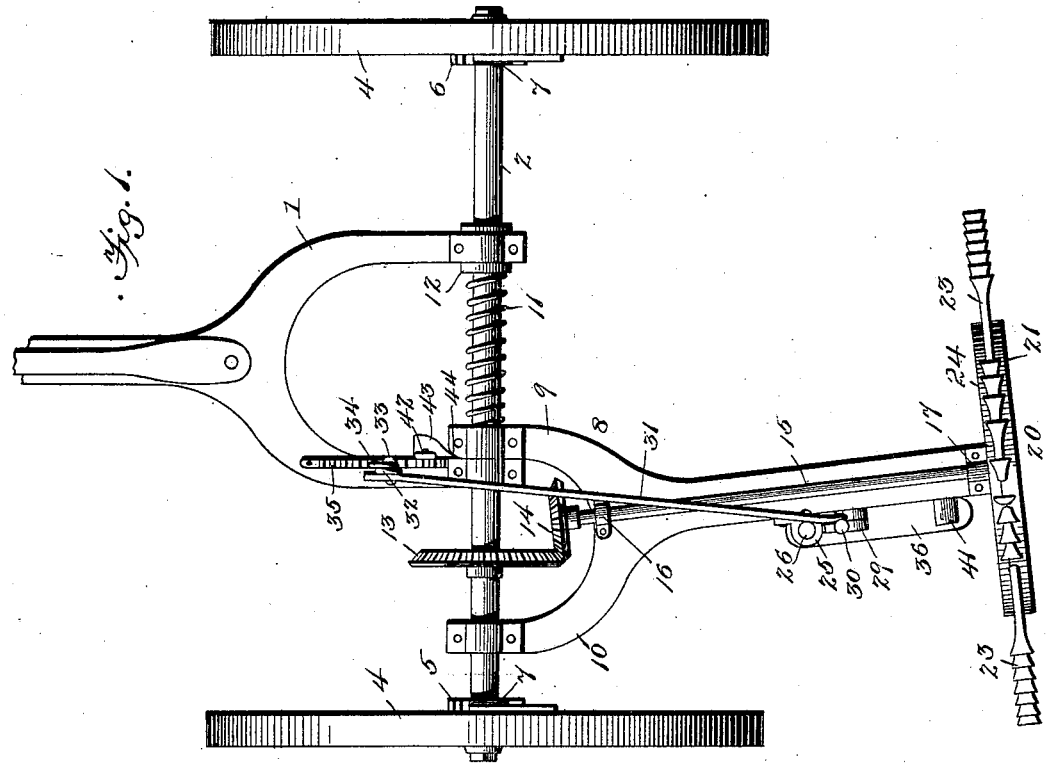
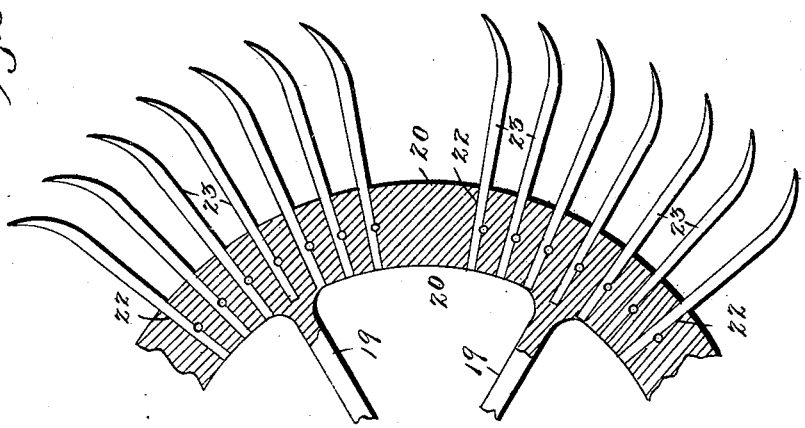
Witnesses
T. L. Mockobie
J. D. Bradford.
Inventor
Aaron L. Hockett
By L. Deane & Son
Attorneys
THE NORRIS PETERS CO., PHOTO-LITHO., WASHINGTON, D. C.

No. 680,457. Patented Aug. 13, 1901.
A. L. HOCKETT.
COTTON CHOPPER.
(Application filed Dec. 14, 1899.)
(No Model.) 2 Sheets—Sheet 2.
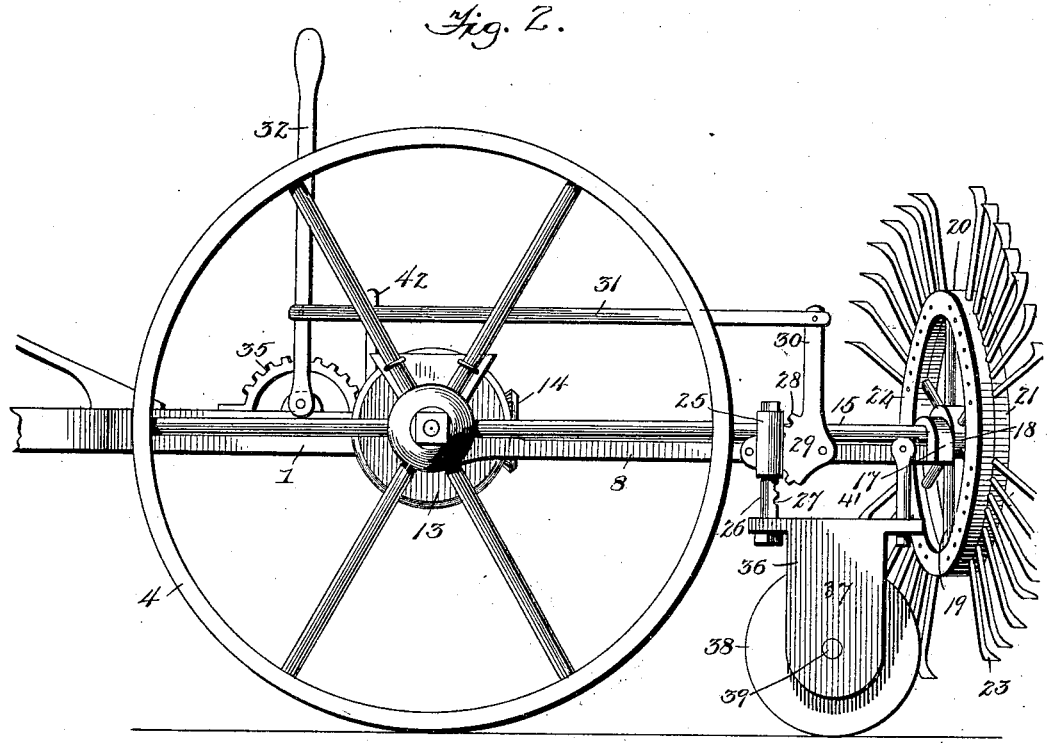
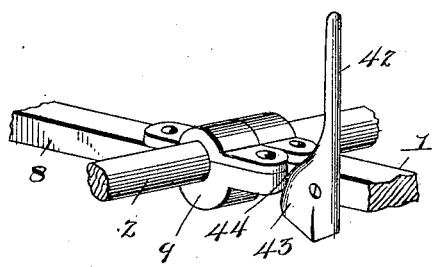
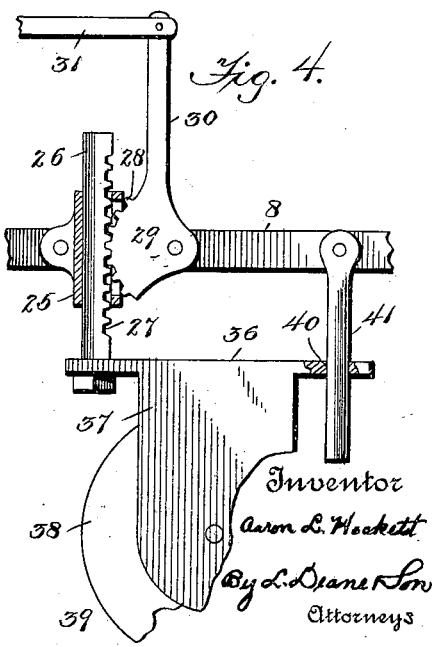
Witnesses
T. L. Mockabee
L. D. Bradford.
Inventor
Aaron L. Hockett
By L. Deane Son
Attorneys

UNITED STATES PATENT OFFICE.

AARON L. HOCKETT, OF MASTODON, MISSISSIPPI.

COTTON-CHOPPER.

SPECIFICATION forming part of Letters Patent No. 680,457, dated August 13, 1901.

Application filed December 14, 1899. Serial No. 740,277. (No model.)

*To all whom it may concern:*

Be it known that I, AARON L. HOCKETT, a citizen of the United States, residing at Mastodon, in the county of Panola and State of Mississippi, have invented certain new and useful Improvements in Cotton-Choppers, of which the following is a specification, reference being had therein to the accompanying drawings.

My invention relates to cotton-choppers; and its object is to provide an efficient machine of this character which may be constructed economically and easily operated.

The characteristic features of the invention will be fully described hereinafter, and defined in the appended claims.

In the accompanying drawings, Figure 1 is a plan view of a machine embodying my invention. Fig. 2 is a side elevation of the same. Fig. 3 is a detail perspective view showing the mechanism for throwing the chopping-wheel shaft into and out of gear. Fig. 4 is a detail perspective view of the mechanism for adjusting the chopping-wheel vertically, and Fig. 5 is a sectional view of a portion of the chopping-wheel.

The reference-numeral 1 designates a yoke constituting the main frame of the machine and provided at its rear ends with bearings within which is supported an axle 2, upon which are mounted loosely carrying and driving wheels 4.

The numerals 5 and 6 designate ratchet-wheels fixed upon the axle 2, one adjacent to and concentric with each of the wheels 4, which latter are each provided with a spring-pressed pawl 7, adapted to engage the ratchet-wheels to cause the axle to revolve with the wheels or to be disengaged from the ratchets when it is desired to move the machine without operating the chopping mechanism.

8 designates a frame for supporting the chopping-wheel shaft, the forward end of said frame being bifurcated to form an inner arm 9 and an outer arm 10, the latter being longer than the arm 9 and so curved as to project the frame 8 rearward at an angle to the axle, as shown. The front ends of the arms 9 and 10 are formed with bearings through which the axle extends, the shorter arm 9 lying within and normally in contact with the adjacent side of the yoke 1. Upon the axle 2 is arranged a coil-spring 11, one end of which bears against a collar 12, fixed to the axle, and the other end against the arm 9 to hold the latter against the frame 1.

Upon the axle 2, between the arms 9 and 10, is secured a bevel gear-wheel 13, which meshes with a bevel gear-pinion 14, mounted upon the front end of a shaft 15, which is supported revolubly by brackets 16 and 17, secured to the frame 8. Upon the rear end of this shaft 15 is mounted the chopping-wheel, which comprises a hub 18, spokes 19, and a rim 20. The rim preferably consists of a fixed section 21, formed with slots or seats 22, (for the hoes or chopping-blades 23,) and a removable ring or section 24, secured upon the section 21 to hold the hoes in position. As shown in the drawings, the hoes or blades 23 project radially in groups from the wheel, the spaces between the groups being regulated with reference to the work to be done and the judgment of the operator.

It will be observed that the chopping-wheel rests at an angle to the axle, thus insuring a freer action as the hoes cut across the row.

At one side of the frame 8 is secured a sleeve 25, having a longitudinal slot at its rear side. Within this sleeve 25 is loosely supported a vertical shaft 26, formed at its rear side with a series of depressions 27 to receive teeth 28, projecting from a cam 29, pivotally secured to the frame 8 and having a lever-arm 30, connected by a rod 31 with a lever 32, fulcrumed upon the frame 1 and having a pawl 33 and finger-piece 34, coöperating with a ratchet-segment 35, secured to the main frame.

The shaft 26 projects from a bracket 36, having parallel ears 37, between which is mounted a feed-wheel 38 upon a shaft 39. The rear end of the bracket 36 is formed with an opening 40, into which projects a guide-pin 41, the office of which is to guide the bracket and keep it in proper relation to the frame 8, and still permit the latter to be adjusted vertically.

42 designates a lever fulcrumed upon the inner side of the frame 1 and provided at its lower end with a cam 43, which is adapted to come in contact with the arm 9 of the frame 8 to force said arm 9 inward against the tension of the spring 11, and thus move the bevel gear-pinion 14 out of gear with the gear-wheel 13. The arm 9 is beveled at the point 44 to facilitate the operation of the cam-lever 42.

The operation of the machine is as follows: Normally the lever 42 is out of contact with the arm 9 and the gears 13 and 14 are held in mesh by the spring 11. Assuming that the wheels 4 are locked to the axle by their pawl-and-ratchet mechanism, the revolution of the wheels and axle causes the gear 13 to drive the shaft 15, and thus revolve the chopping-wheel. By means of the lever 32 and rod 31 the toothed cam 29 is operated to raise or lower the frame 8 through the medium of the vertical shaft 26. To throw the shaft 15 out of gear, it is only necessary to throw the lever 42 forward, as has been described above.

The feed-wheel is so located with relation to the chopping-wheel as to catch the side draft caused by the revolution of the hoes.

If preferred, the gearing of the chopping-wheel shaft may be so proportioned as to cause the hoes to cut at right angles to the row.

I claim—

1. In a cotton-chopper, the combination with the axle and supporting main frame, of a frame projecting rearward from the axle at an angle thereto, a shaft supported in bearings on said frame, a chopping-wheel provided with peripheral blades or hoes arranged in groups or series, with spaces between the groups or series, and gearing for driving said shaft.

2. In a cotton-chopper, the combination with the axle and main frame, of a frame extending rearward from the axle and having its front end bifurcated, a shaft supported in bearings on said frame, a chopping-wheel mounted on the rear end of the shaft, gearing for driving said shaft, and means for throwing said shaft out of gear comprising a coil-spring around the axle, and a cam-lever for moving the frame.

3. In a cotton-chopper, the combination with the axle and main frame, of a frame extending rearward from the axle and bifurcated at the front end, a shaft supported on said frame, a chopping-wheel provided with radially-projecting hoes arranged in groups, means for driving said shaft, and means for adjusting the chopping-wheel vertically.

4. In a cotton-chopper, the combination with the axle, of a frame bifurcated at its forward end, and extending rearward at an angle, gearing located between the arms of the frame, a shaft supported in bearings on said frame, a chopping-wheel mounted on the rear end of the shaft and provided with groups of hoes, a feed-wheel located in front of the chopping-wheel, and means for adjusting the chopping-wheel vertically.

5. In a cotton-chopper, the combination with the axle and main frame, of a rear frame supported at its front end upon the axle, a shaft on said frame, a chopping-wheel at the rear end of said shaft, a feed-wheel supported by a bracket in front of the chopping-wheel, and means for adjusting the chopping-wheel comprising a slotted sleeve, a vertical shaft within the sleeve provided with a series of depressions, a toothed cam adapted to engage said vertical shaft, and an operating-lever and connecting-rod for operating said cam.

6. In a cotton-chopper, the combination with an axle and main frame, of a rear frame, a shaft on said rear frame, a chopping-wheel at the rear end of the shaft, gearing for driving said shaft, a bracket suspended from the rear frame and carrying a feed-wheel, means for adjusting the rear frame vertically, and a guide-pin projecting into an opening in said bracket.

In testimony whereof I affix my signature in presence of two witnesses.

AARON L. HOCKETT.

Witnesses:
W. H. WALL,
W. H. ALEXANDER.